Figure 1:
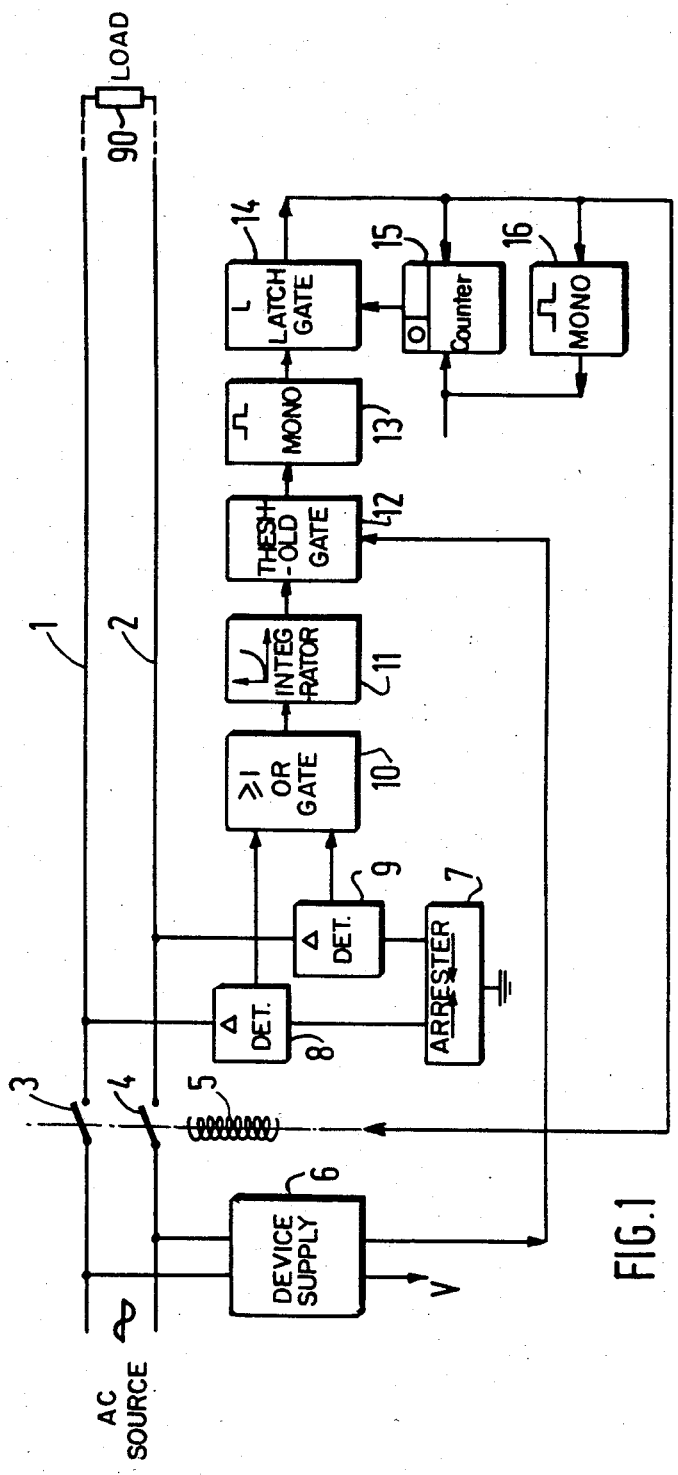

United States Patent [19]

Huvet et al.

[11] Patent Number: 4,605,981
[45] Date of Patent: Aug. 12, 1986

[54] INDUSTRIAL OR DOMESTIC OVERVOLTAGE PROTECTIVE DEVICE

[75] Inventors: Jean-Marie Huvet, Rilly La Montagne; Gerard J. Serrie, Jonchery Sur Vesle, both of France

[73] Assignee: Claude, S.A., Puteaux, France

[21] Appl. No.: 629,308

[22] Filed: Jul. 10, 1984

[30] Foreign Application Priority Data

Jul. 13, 1983 [FR] France .................................. 83 11681

[51] Int. Cl.⁴ .............................................. H02H 9/04
[52] U.S. Cl. ..................................... 361/91; 361/131; 361/71
[58] Field of Search ...................... 361/55, 56, 71, 72, 361/91, 112, 114, 73, 93, 102, 109, 110, 111, 117, 131

[56] References Cited

U.S. PATENT DOCUMENTS 3,405,318 10/1968 Gilker .................................... 361/73

FOREIGN PATENT DOCUMENTS 2397728  3/1979  France ................................ 361/117
52-17646 2/1977  Japan .................................. 361/117
54-34043 3/1979  Japan .................................. 361/117
54-66442 5/1979  Japan .................................. 361/117

Primary Examiner—A. D. Pellinen
Assistant Examiner—H. L. Williams
Attorney, Agent, or Firm—Edward J. Coleman

[57] ABSTRACT

The device includes two detectors of overvoltage (8, 9) each connected between a respective one of a pair of power line conductors (1, 2) and a respective input of an arrester (7). The outputs of the detectors are connected to an OR-gate (10) the output signal of which is applied to a threshold gate (12). The output of gate (12) is connected to a first monostable trigger (13) having a first time constant and controlling, through a latch gate (14), a bipolar insulating device (3, 4) isolating the load (90) from the power network. In order to achieve the automatic reconnection of the load after each perturbance, the output of the latch gate (14) is also connected to a second monostable trigger (16) having a second time constant higher than the first, and to the clock input of a counter (15) having its return-to-zero terminal connected at the output of the second monostable trigger. Preferably, an integrator (11) is connected between the OR-gate (10) and the threshold gate (12).

7 Claims, 2 Drawing Figures

INDUSTRIAL OR DOMESTIC OVERVOLTAGE PROTECTIVE DEVICE

This invention relates to overvoltage protective devices that function to disconnect a load from a power line when a protective module, such as an arrester, connected to the line is not able to dissipate the overvoltage energy without destructive effect to the components of the associated arrester.

The protection of the load against the overvoltages is generally provided by a gas spark gap associated with variable resistors that function to limit the voltage applied to the load to a non-destructive value and to short the energy of the overvoltages to ground or to dissipate it in the protective module. The life of such arresters basically depends upon the number of such perturbances. In fact, when the arrester must operate numerous times in a short period, the resulting overheating may destroy it and, thus, result in shunting of both conductors of the line or in grounding of one of them.

In order to avoid these disadvantages, calibrated fuses are often used, but such fuses inherently limit the load and must be changed after each important perturbance.

It is desirable, therefore, to design an overvoltage protective device which may isolate the load as soon as the associated arrester is not able to dissipate the overvoltage energy without destruction of the arrester or of the joined fuses.

Moreover, it is desirable that the operation of such a device does not require human intervention to reconnect the load to the power line if the perturbances are transitory.

Accordingly, it is an object of the invention to provide an industrial or domestic protective device which provides the above-mentioned advantages.

To achieve this object, the invention provides disconnection of the load and the arrester from the power line when the energy to be dissipated in the arrester matches a determined threshold. Re-connection automatically occurs after a first time lapse. If disconnection occurs more than a predetermined number of times during a second time lapse, the load and the arrester remain disconnected in order to permit verification of the electrical installation and manual reset of the device. If disconnections during the second lapse do not reach the predetermined number, the device is reset.

According to the invention, the overvoltage protective device includes two detectors of overvoltage each connected between a respective power line conductor and respective input of an arrester, with the detector outputs connected to an OR-gate. The output signal of the OR-gate is coupled to a threshold gate, the output of which is connected to a first monostable trigger having a first time constant. The output is the first monostable is applied through a latch gate to control the opening of a bipolar device (e.g. relay contacts) for isolating the load from the power line. This bipolar device is connected in series in both power line conductors between the detector connection to the power line and the connection to the power line of the device supply circuit.

In order to provide automatic reconnection of the load after each perturbance, if there is no excess number of successive disconnecting perturbances and no problem in the electrical installation, the output of the threshold gate is also coupled to a second monostable trigger, having a second time constant greater than the first monostable, and is also coupled to the clock input of a counter having its return-to-zero input coupled to the first output of the second monostable trigger. A second output of the counter is connected to the second input of the latch gate.

In order to avoid the disconnection of the load for a fugitive but important overvoltage perturbance, and to increase the performance of the device, it is preferred to connect an integrator between the OR-gate and the threshold gate. Then the signal applied to the threshold gate is the integrated signal of the output signal of the OR-gate and is a logical function of the energy dissipated by the arrester and not only of the perturbance current amplitude.

In order to achieve the manual reset operation when the latch gate has locked open the bipolar device, a second latch gate may be connected to the output of the second monostable trigger and the output of the counter for avoiding the automatic application of a return-to-zero signal to the counter. A switch, e.g. a push-button switch, is then connected to this second latch gate in order to manually apply this return-to-zero signal and to reset the device.

Figure 2:
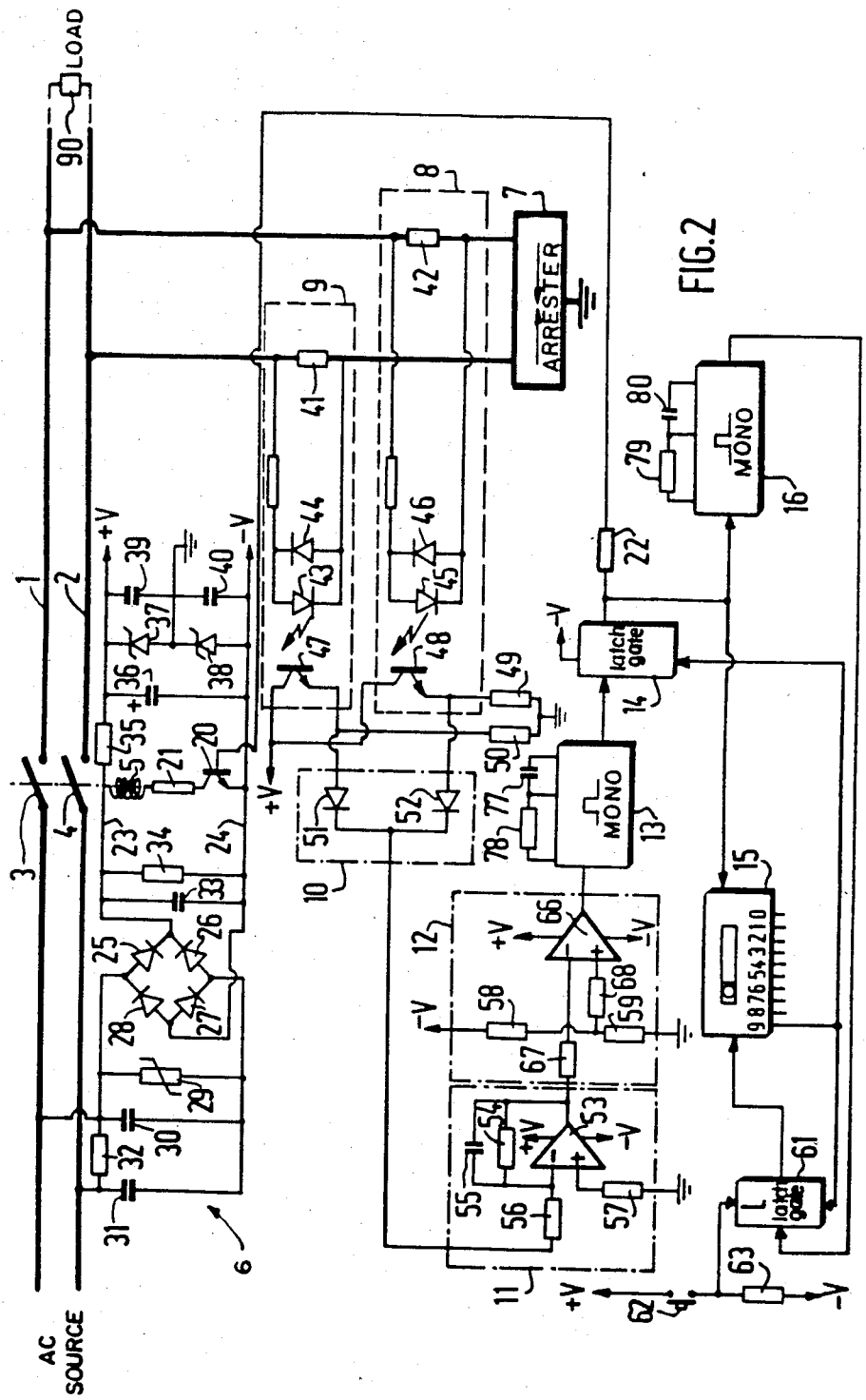

This invention will be better understood, along with other objects, advantages and features thereof by referring to the following description of an embodiment, together with the accompanying drawings, of which:

FIG. 1 is a block diagram of the electrical circuit of an overvoltage protective device according to the invention, and FIG. 2 is a schematic circuit diagram of a preferred embodiment of the device according to the invention.

Referring now to FIG. 1, the power line has two electrical conductors 1, 2 connecting the a.c. source (at the left of the FIG. 1) to a load 90 (at the right of the FIG. 1), via the contacts 3, 4 of a normally closed relay, the opening of which is controlled by the coil 5. The device supply circuit 6 is connected to the power line upstream of the relay contacts 3,4 in order to supply DC voltage (+V, −V) to the device even if these contacts are open.

The arrester 7 is connected to both conductors of the power line and to ground in order to allow the dissipation of the overvoltage energy. The connection of the arrester 7 to the power line is located downstream of the relay contacts 3, 4 in order to isolate both load and arrester when the contacts are open.

Between each power line conductor and a respective input of the arrester 7 are respectively connected two detectors 8, 9 of overvoltage currents in order to detect an overvoltage on either of the conductors of the power line as well as an overvoltage on both conductors. The outputs of detectors 8, 9 are connected to an analog OR-gate 10 in order to deliver a signal for any overvoltage detection. The OR-gate output is connected to an integrator 11 in order to obtain a signal function of the overvoltage energy dissipated by the arrester 7. When this signal is higher than a determined threshold, the threshold gate 12 applies a signal to a first monostable trigger 13, the time constant of which is about one second. This trigger 13 controls, via a latch gate 14, the energizing of the coil 5 in order to open the relay contacts 3, 4 as soon as the energy dissipated by the arrester 7 reaches the maximum rated for the arrester. An output signal of the latch gate 14 is applied to the clock input of a counter 15 and to a second monostable trigger 16.

The counter 15 is advanced one count each time that a signal is delivered to control the opening of the relay contacts 3, 4.

The second monostable trigger 16 has a time constant greater than that of the first trigger 13; this time contact is about one minute. The trigger 16 is connected to generate a return-to-zero signal which is applied to the counter 15 if no new signal has crossed the latch gate 14 during the time constant of the trigger 16. If the counter 15 has been advanced a predetermined number of times without having been returned-to-zero, it generates a signal which locks the latch gate 14, the relay contacts 3, 4 thereupon remaining open until manual reset of the return-to-zero signal to the counter 15.

Referring now to FIG. 2, which schematically illustrates the circuit of such an industrial or domestic overvoltage protective device which has been designed for a 220 Volt, 50 Hertz, 10 Ampere power source, it can be seen that the relay contacts 3, 4 are located on the power line 1, 2 between the upstream connection to the supply circuit 6 of the device and the downstream connection of the arrester 7. The coil 5, controlling the state of the relay contacts 3, 4, is connected in series with a resistor 21 and the emitter-collector junction of a transistor 20, the base of which is connected to the output of the latch gate 14 via a resistor 22. This branch including the coil 5, the transistor 20 and the transistor 21 is connected between the two output conductors 23, 24 of the device-supply circuit 6. Supply circuit 6 is of known type and comprises a bridge rectifier including diodes 25, 26, 27, 28 having its inputs shunted by a varistor 29, a capacitor 30, and a capacitor 31 in series connection with a resistor 32. Resistor 32 is also connected across the conductors 1, 2 of the power line. The bridge output is shunted by a capacitor 33 and a resistor 34 for filtering. A resistor 35 is connected in series in the output conductor 23, and another capacitor 36 is connected as a filter across conductors 23 and 24. Since the device uses integrated circuits, three outputs are required from the supply circuit 6: one delivering a d.c. voltage +V, one delivering the inverted d.c. voltage −V, and one being connected to earth. Accordingly, the supply circuit also including two Zener diodes 37, 38 connected in series across the output conductors 23, 24 with each of the Zener diodes being shunted by a capacitor 39, 40, respectively.

Each one of the overvoltage detectors 8, 9, respectively, includes a low value resistor 41, 42, connected in series with a respective input of the arrester 7. Between the terminals of each of the resistors 41, 42 is connected a set of two parallel electroluminescent diodes 43–44, 45–46, respectively, disposed inversely. Obviously, each set of diodes may be substituted by one two-way electroluminescent semi-conductor. Electroluminescent units are here used in order to electrically decouple the circuit.

These diodes respectively control electroluminescent transistors 47, 48, the emitter of each of which is connected to earth via a respective resistor 50, 49, with the voltage +V applied to the collector of each of the transistors. The output of each detector is the junction point of an emitter and the corresponding resistor 49, 50. These two outputs are connected to the inputs of an OR-gate 10 comprising two diodes 51, 52, the cathodes of which are connected together to provide the OR-gate output, the inputs of the OR-gate being the anodes of these diodes 51, 52. With such a design, the output signal of the OR-gate 10 is an analog signal function of the current flowing at either input of the arrester 7.

The output signal of the OR-gate 10 is applied to the input terminal of the integrator 11, which comprises a differential amplifier 53 having a feedback loop including in parallel a resistor 54 and a capacitor 55. The inputs of this differential amplifier 53 are respectively connected to the output of the OR-gate 10 through a resistor 56 and to ground, through a resistor 57. The signal delivered by the integrator 11 is applied to a threshold gate 12 which includes a differential amplifier 66, one input of which is connected to the output terminal of the integrator 11 through a resistor 67, the other input being connected through a resistor 68 to a voltage divider including two resistors 58, 59. The output of the threshold gate 12 is connected to a first monostable trigger 13 the time constant of which is determined by the value of a capacitor 77 and a resistor 78. Its output terminal is connected to one input of a latch gate 14, known on the market under the name "D-Latch".

A second monostable trigger 16 has a time constant which is about one minute and is determined by the value of the resistor 79 and of the capacitor 80. As before mentioned, the input of trigger 16 is connected to the output of the latch gate 14, which is also connected to the clock input of a decimal counter 15.

In FIG. 2, the tenth output of counter 15 (output #9) is connected to the second input of the latch gate 14 but, obviously, it is possible to connect any other output of the counter 15 according to the desired result. In order to provide a manual reset operation, a second latch gate 61 is connected to the output of the second monostable trigger 16 and to the same output of the decimal counter 15, in order to prevent automatic application of a return-to-zero signal to the decimal counter 15 when the counter 15 generates a signal on its used output. For this reason, a push-button switch 62 is provided in series with a resistor 63 between the voltages +V and −V. The junction point of this push-button switch 62 and the resistor 63 is connected to one input of the latch gate 61.

In operation, the signal delivered by the OR-gate 10, which is a function of the current applied to the input of the arrester 7, is integrated by the integrator 11. When the resulting signal matches a value determined by the bridge of resistors 58, 59, a pulse is applied to the first trigger 13 which changes state. As a result, transistor 20 is turned on and the coil 5 is energized to control the opening of the relay contacts 3, 4. Simultaneously, the counter 15 is advanced one count and a pulse is applied to the second monostable trigger 16, the time constant of which is longer than that of trigger 13. At the end of the time constant of the trigger 13, transistor 20 returns to its off-state, thereby deenergizing coil 5 and closing the relay contacts 3, 4. If no new impulse is applied to the first trigger input during the time constant of the second trigger 16, then trigger 16, through the second latch gate 61, applies a return-to-zero signal to the counter 15, which thereupon returns to the zero state.

But if another impulse is applied to the first trigger 13 during the time constant of the second trigger 16, the relay contacts 3, 4 are once more opened during the time constant of the first trigger 13 and the counter delivers a signal on its second output.

If new impulses are applied to the first trigger 13 input before the second trigger 16 comes back to its stable state, the relay contacts 3, 4 are each time opened, and the counter 15 is advanced. At the tenth impulse, the counter 15 delivers a pulse which is applied to the latch gate 61 in order to lock it, thereby blocking the second monostable trigger 16 from applying a return-to-zero signal; said pulse delivered by the counter 15 is also applied to the latch gate 14 in order to lock it, thereby locking open the relay contacts 3, 4.

Then only a manual intervention on the push-button switch 62 may reset the device.

In the described embodiment of the invention, the monostable triggers are integrated circuits #4528 B, the counter is an integrated circuit #4017 B, the latch gates are D-Latches #4042, and all these components are available on the market under the trademark "INTEL". The value of the resistors 41–42 of the overvoltage detectors 8–9 is about a few tens of milliOhms.

Obviously, even if only one preferred embodiment of the device according to the invention has been described, further modifications, or changes will also occur to those skilled in the art, such being deemed to fall within the spirit and scope of the present invention.

We claim:

1. An industrial or domestic overvoltage protective device for disconnecting a load (90) and a corresponding protective module (7) from both conductors (1, 2) of a power line when said protective module (7) is not able to dissipate all the overvoltage energy without destructive effect, characterized in that it includes in combination:
   a power supply circuit (6) connected upstream to the power line;
   two detectors of overvoltage (8, 9) each connected downstream between a respective one of the power line conductors (1, 2) and a respective input of said protective module (7);
   one OR-gate (10) having its inputs connected to the outputs of each of said detectors (8, 9);
   a threshold gate (12) having one input coupled to the OR-gate output (10);
   a first monostable trigger (13) having a first time constant, to which is applied the output signal of said threshold gate (12);
   a first latch gate (14) to which is applied the output signal of said first monostable trigger (13), and having an output connected to means (5) for controlling the state of a bipolar insulating device (3, 4) located in series in both power line conductors (1, 2) between the downstream detector connection to the power line and the upstream connection to the power line of the power supply circuit (6).

2. A device according to claim 1 characterized in that it further includes:
   a second monostable trigger (16) having a second time constant higher than the time constant of the first monostable trigger and having an output coupled to a second input of said first latch gate (14);
   a counter (15) having its return-to-zero input coupled to an output of said second monostable trigger (16) and its clock input connected to the output of said first latch gate (14).

3. A device according to claim 2 characterized in that it further includes a second latch gate (61) connected to the output of said second monostable trigger (16) and to the output of said counter (15), and having an input connected to a push-button switch (62) in order to manually apply a return-to-zero signal to said counter (15).

4. A device according to claim 3 characterized in that said counter (15) is a decimal counter.

5. A device according to claim 4 characterized in that said latch gates (14, 61) are D-Latch integrated circuits.

6. A device according to claim 1 characterized in that it further includes an integrator (11) having an input connected to the output of said OR-gate (10) and an output connected to the input of said threshold gate (12) in order to apply to said threshold gate (12) a signal which is a function of the energy dissipated in said protective module (7).

7. A device according to claim 2 characterized in that the time constant of said first monostable trigger (13) is in the order of one second, while the time constant of said second monostable trigger (16) is in order of one minute, said counter (15) applying a lock signal to said first latch gate (14) after about ten disconnections of the bipolar insulating device (3, 4) during the time constant of said second monostable trigger (16).

* * * * *